United States Patent [19]

Nedelk

[11] Patent Number: 4,923,056
[45] Date of Patent: May 8, 1990

[54] METHOD OF INCREASING THE SERVICE LIFE OF AIRCRAFT CARBON DISK BRAKES

[75] Inventor: John Nedelk, Massillon, Ohio

[73] Assignee: Aircraft Braking Systems Corporation, Akron, Ohio

[21] Appl. No.: 312,994

[22] Filed: Feb. 21, 1989

[51] Int. Cl.⁵ .............................................. B60T 17/00
[52] U.S. Cl. ................................ 188/71.1; 188/151 R; 188/196 R; 188/382; 244/111; 303/1; 303/9.61
[58] Field of Search .................... 303/1, 9.61, 13, 2-3; 244/110 A, 111; 188/151 A, 152, 1.11, 71.1, 71.7, 71.8, 71.9, 79.51, 151 R, 158, 382, 196 R, 71.5

[56] References Cited

U.S. PATENT DOCUMENTS

| | | | |
|---|---|---|---|
| 3,794,509 | 2/1974 | Trauger et al. | 244/110 A X |
| 4,293,165 | 10/1981 | Hirzel | 244/111 X |
| 4,327,413 | 4/1982 | Ruof | 244/111 X |
| 4,402,478 | 9/1983 | Martin | 244/111 |
| 4,410,153 | 10/1983 | Romero | 244/111 |
| 4,430,715 | 2/1984 | Gentef et al. | 244/111 X |
| 4,580,744 | 4/1986 | Guichard | 244/111 |
| 4,613,190 | 9/1986 | Johnson | 244/111 X |
| 4,640,475 | 2/1987 | Zoerb | 244/111 |
| 4,742,895 | 5/1988 | Bok | 188/71.7 |
| 4,792,192 | 12/1988 | Tveitane | 244/111 X |

Primary Examiner—Douglas C. Butler
Attorney, Agent, or Firm—L. A. Germain

[57] ABSTRACT

The invention is directed to a method of increasing and/or extending the operational service life of an aircraft brake disk stack by selectively limiting the number of brake assemblies which comprise the aircraft landing gear configuration and which are put into operation during the time the aircraft is on the ground and subject to taxi-snub braking cycles while also providing that all of the brake assemblies of the total available on the aircraft are operational during landing of the aircraft.

11 Claims, 1 Drawing Sheet

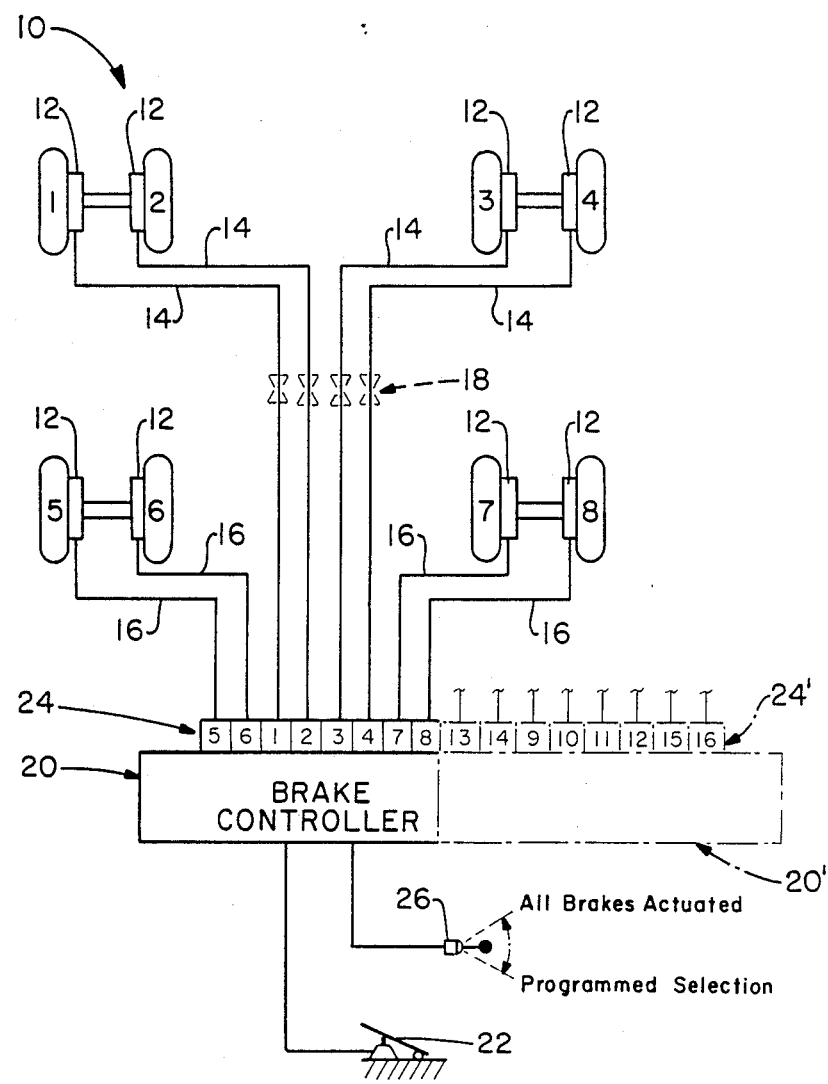

4,923,056

METHOD OF INCREASING THE SERVICE LIFE OF AIRCRAFT CARBON DISK BRAKES

BACKGROUND OF THE INVENTION

This invention generally pertains to aircraft brakes and more particularly to multiple brake configurations as may be found on commercial and/or military transport aircraft More specifically, the invention provides a method of increasing the service life of carbon disks as used in multi-disk brake assemblies of large aircraft.

Refurbishment of brakes for large aircraft requires taking the aircraft out of service for a period of time such that worn disks of a brake disk stack may be replaced. Such down-time of these type aircraft is costly to the industry and it would be extremely beneficial if down-time could be shortened or, alternatively, the period between brake refurbishment lengthened. Manufacturers of aircraft brake assemblies have designed features into the assembly which attempt to make brake disk replacement more efficient, however, these efforts have met the limit and aircraft down-time remains a costly procedure.

While considerable attention has been given to the design of aircraft brake assemblies, brake service life is primarily determined by the number of landing stops which such brake assemblies are subjected to. For example, a particular brake disk stack may be functional for two thousand landings before it must be taken out of service and inspected for wear. At this point in the brake life, the disk components will probably be completely replaced with new disks. While it would seem to the casual observer that the greatest brake wear occurs during high-speed stops upon landing of an aircraft, a large proportion of brake wear actually occurs prior to take-off when the aircraft experiences numerous taxi stops. These taxi-snub cycles are more prevalent because of the increased traffic at congested airports from which these aircraft operate. During these taxi stops, all of the brakes on the aircraft are put into operation regardless of the type of braking being applied, i.e., whether the aircraft is brought to a full stop or just slowed.

In accordance with a primary aspect of the present invention, a method is provided which increases the length of time between major brake overhauls when the disks of the brake disk stack are sufficiently worn and must be replaced.

SUMMARY OF THE INVENTION

The primary object and other objects and advantages of the invention may be accomplished in a method to increase the service life of multi-disk brake assemblies where multiples of such assemblies are mounted on an aircraft comprising the steps of:

providing a programmable brake controller which operates in conjunction with a pilot's control for braking of the aircraft;

installing switch means within the circuitry of each brake assembly, the switch means being interconnected through the brake controller to actuate each of said respective brake assemblies; and programming the brake controller to select various of the brake assemblies for braking action in accordance with a particular sequence such that all of the brake assemblies are actuated during an aircraft landing operation and only a preselected group of the total of brake assemblies is actuated during taxi braking operations of the aircraft when it is on the ground.

BRIEF DESCRIPTION OF THE DRAWING

For a complete understanding of the invention, reference should be made to the following detailed description and the accompanying drawing which is a diagramatic plan view of an aircraft multi-brake configuration, the portion of the figure in solid lines being indicative of an eight-wheel arrangement of multi-disk brake assemblies or alternatively it could be indicative of one-half of a sixteen-wheel arrangement, in which case the opposite eight wheels (not shown) will be similarly controlled, the expansion of the brake controller being indicated in the drawing by the ghost line showing.

DETAILED DESCRIPTION OF THE INVENTION

This invention is directed to a method of increasing and/or extending the operational service life of a brake disk stack, the disk stack comprised of a plurality of carbon disk frictional braking elements. The service life is the period of operation beginning with that point in time when a particular brake is put into service and ending when the disk stack must be replaced by a new disk stack. The brake disk stack is an integral and functionally important part of a brake assembly, there being a plurality of such brake assemblies each associated with a respective wheel and forming the total landing gear configuration as may be mounted on a particular aircraft. Large airliners of the type alluded to, whether jet type or otherwise, have at least four or as many as sixteen or more such brake assemblies and these are mounted in association with respective wheels.

Generally, the method of the present invention comprises selectively limiting the number of brake assemblies of the total available on the aircraft landing gear which are put into operation during the time the aircraft is on the ground and subject to taxi-snub braking cycles. This is accomplished while also providing that all of the brakes of the available total number of brakes are rendered operational for normal braking, i.e., during landing of the aircraft.

The method of the present invention may be accomplished in various ways which will become apparent to those persons knowledgeable in this art, however, only two examples will be described in detail. Referring to the drawing, an eight-wheel landing gear arrangement is diagrammatically illustrated in solid lines and generally indicated by reference numeral 10. The wheels of the landing gear are indicated by numerals 1–8 and each of these include an associated and identical brake assembly 12. The brake assemblies 12 are of the multi-disk, brake-disk stack type and may be either hydraulically actuated or electrically actuated, the type of actuation not being an important consideration in the practice of the invention. For example, if hydraulically actuated, the feedlines 14 for the brake assemblies 12 of wheels 1-4 will be hydraulic fluid conduits and, if electrically actuated, the feedlines 14 will comprise electrical lines. The same is true of the feedlines 16 associated with brake assemblies 12 of wheels 5-8. In either case, whether hydraulically or electrically actuated, the brake system 10 is operated by a brake controller 20 in communication also with a pilot's brake actuation pedal 22.

According to a first example of the invention, one may install one-way check valves shown in ghost and indicated generally at 18 in the circuitry of a first group of brake assemblies. In this example the first group will comprise the brake assemblies 12 of wheels 1-4 and the check valves 18 will be set to a predetermined pressure threshold which is established for a particular aircraft and braking system. The brake assemblies 12 of wheels 1-4 therefore will only be actuated at pressures above the threshold value. The remaining brake assemblies 12 associated with wheels 5-8 do not have check valves in their circuitry and therefore these brake assemblies will be actuated at all pressures. Because the taxi-snub braking cycles occur during low pressures, the brakes of wheels 5-8 which do not have check valves 18 will be operational during this type braking. Thus, by a proper selection of the threshold pressure for check valves 18, the taxi-snub braking will be handled by less than the full complement of brake assemblies 12. In this example, while brake assemblies 12 for the wheels 5-8 will be actuated for all braking requirements of the aircraft, the brake assemblies 12 for the wheels 1-4 will only be actuated for braking above the threshold value of the valves 18. It should be appreciated from this example that the carbon disk elements of the brake assemblies 12 associated with wheels 1-4 will exhibit a longer operational service life over the brake assemblies for wheels 5-8.

While the above-described brake selectivity method will work to extend the operational service life of some of the brakes, it will be recognized that the brake disks of brake assemblies 12 of the wheels 5-8 will have the same service life which is no different than before. This is so because the brakes of wheels 5-8 will be operational over the same range of braking requirements as before and therefore will have to be serviced at the same frequency. In this circumstance, the aircraft will be taken out of service at the same service interval and only to service half of the full complement of brakes. This is, of course, an inefficient procedure. While the down-time may be shorter because only half of the brake assemblies will require refurbishment, a second period of down-time will be required when the remaining group of brake assemblies 12 for wheels 1-4 reach the end of their service life.

While the above-described method will result in extending the service life of one group of brake assemblies of a total complement of brake assemblies, a more efficient and preferred method is possible. Referring again to the drawing and eliminating the check valves 18 from the brake circuitry, the present method includes a plurality of switch or valve means indicated at 24, each one associated with a respective brake assembly 12 of the wheels 1-8. The switch or valve means 24 are controlled by the brake controller 20 which may be programmed to actuate various of the brake assemblies in accordance with a predetermined sequence. For example, brake assemblies 12 associated with wheels 1, 2, 3 and 4 may be programmed to be actuated for a first taxi stop. A second subsequent taxi stop will use brake assemblies 12 of wheels 5, 6, 7 and 8. By repeating this cyclic operation for subsequent taxi stops prior to take-off, the total taxi-snub brake wear is reduced by 50% as compared to the situation wherein all of the brakes are actuated each and every taxi stop. In addition, the brake disk wear is evened out over all of the brakes of a particular landing gear arrangement. Once the aircraft is airborne, the controller 20 reverts to an all-brake actuation sequence which is necessary when the aircraft comes in for a landing. This may be accomplished automatically by a switch 26 associated with the landing gear such that when the landing gear is raised after "take-off" the brake controller 20 reverts to an all-brake complement condition in preparation for a landing. Alternatively, the switch 26 may be a pilot-controlled switch allowing the pilot to manually select the type of braking action established in the brake controller 20. From the above description, it can be appreciated that the controller 20 may select any combination of brake actuation dependent upon the programmed selection. For example, instead of alternating taxi-snub braking cycles between groups of brake assemblies including a first group associated with wheels 1-4 and a second group associated with wheels 5-8 as suggested above, the first group may be programmed to comprise brake assemblies associated with wheels 2, 3, 6 and 7 while the second group may comprise assemblies associated with wheels 1, 3, 5 and 8. Alternatively, and this will depend upon the type of aircraft and the braking capability of each individual brake assembly 12, the programmed selection may only comprise brake assemblies associated with two wheels such as for example wheels 1 and 4, or 2 and 3, or 6 and 7, or 5 and 8. Of course, in an aircraft landing gear comprised of a four-wheel configuration the brake pre-selection is obviously limited to a two-of-four selection for balanced braking of the wheels.

It will, of course, be recognized by those skilled in this art that the drawing may as well be illustrative of one-half of a sixteen-wheel landing gear arrangment, the opposite eight wheels (not shown) being identically arranged. Of course, it is not material to this invention where the actual landing gear are mounted on the aircraft as some are mounted under the wings while others are mounted to the fuselage. In any event, the brake controller 20 and switch means 24 may be expanded as indicated at 20' and 24' respectively to cover any landing gear arrangement whether for 2, 4, 8, 16 or more wheels and associated brake assemblies. Obviously, as the number of brake assemblies increases, so does the number of possible combinations for taxi braking preselection. Therefore, this invention is not considered limited in any way to any particular number of wheels of a landing gear arrangement which may be preselected for taxi braking or the particular sequence that such wheels are preselected. In all cases, the total number of wheels are always used in aircraft landing situations.

From the foregoing detailed description, it can be appreciated that the method of the invention offers a marked increase in the service life of the disks which comprise a brake disk stack of a brake assembly and, while certain representative embodiments and details have been shown for the purpose of illustrating the invention, it will be apparent to those skilled in this art that various changes and/or modifications may be made without departing from the spirit or scope of the invention.

What is claimed is:

1. A method of increasing the service life of carbon disks which form the functional braking elements of a brake disk stack of an aircraft brake assembly, each brake assembly associated with a respective wheel of a plurality of wheels which comprise a landing gear configuration of the aircraft, the method comprising the steps of:

establishing a preselected first group of brake assemblies of a total number of brake assemblies which are actuated for both low-pressure and high-pressure braking of the aircraft;

establishing a preselected second group of brake assemblies which comprises the remaining number of the total number of brake assemblies which are actuated only during high-pressure braking of the aircraft;

actuating the first group of brake assemblies during the taxi-snub stops of the aircraft when it is on the ground; and actuating the first and second groups of brake assemblies during landing of the aircraft.

2. The method of claim 1 wherein the preselection of the second group is accomplished by placing check valves in the brake circuitry of the group, the check valves being set at a preselected threshold pressure above which the brake assemblies of the group are actuated for braking effort.

3. A method of increasing the service life of carbon disks which form the functional braking elements of a brake disk stack of an aircraft brake assembly, each brake assembly associated with a respective wheel of a plurality of wheels comprising a landing gear configuration of the aircraft, the method comprising the steps of:

providing a programmable brake controller which operates in conjunction with a pilot's control for braking of the aircraft;

installing switch means within the circuitry of each brake assembly, the switch means being interconnected through the brake controller to actuate each of said respective brake assemblies; and programming the brake controller to select various of the brake assemblies for braking action in accordance with a particular sequence such that all of the brake assemblies are actuated during an aircraft landing operation and only a preselected group of the total of brake assemblies is actuated during taxi braking operations of the aircraft when it is on the ground.

4. The method as set forth in claim 3 wherein an aircraft landing gear comprises an eight-wheel configuration and the controller is programmed to select a first four-wheel group for an initial taxi braking of the aircraft and a second four-wheel group for a subsequent taxi braking, the first and second four-wheel groups being alternated between additional taxi braking of the aircraft, said controller being programmed to revert to an eight-wheel braking of the aircraft when subject to a landing operation.

5. The method as set forth in claim 4 wherein the first four-wheel group selected for initial taxi braking comprises a forward four wheels of the eight-wheel configuration and the second four-wheel group comprises a rearward four wheels of the eight.

6. The method as set forth in claim 4 wherein the first four-wheel group selected for initial taxi braking comprises two forward wheels of the eight-wheel configuration and two rearward wheels of the eight and the second four-wheel group comprises the remaining two forward wheels and the remaining two rearward wheels of the eight-wheel configuration.

7. The method as set forth in claim 4 wherein the first four-wheel group selected for initial taxi braking comprises two outboard forward wheels of the eight-wheel configuration and two outboard rearward wheels of the eight and the second four-wheel group comprises two inboard forward wheels and two inboard rearward wheels of the eight-wheel configuration.

8. The method as set forth in claim 4 wherein the first four-wheel group selected for initial taxi braking comprises two inboard forward wheels and two outboard rearward wheels of the eight-wheel configuration and the second four-wheel group comprises two outboard forward wheels and two inboard rearward wheels of the eight-wheel configuration.

9. The method as set forth in claim 3 wherein the first group of wheels selected for initial taxi braking comprises two wheels of the eight-wheel configuration and each subsequent group comprises a different two of the eight-wheel configuration until all pair combinations of the eight are utilized for taxi braking and the controller repeats the cycle for subsequent taxi braking.

10. The method as set forth in claim 3 wherein the aircraft total wheel and brake assembly comprising the landing gear is a four-wheel configuration and two wheels of the four ar programmed for initial taxi braking and these alternate with the remaining two wheels for subsequent taxi braking, all wheels of the four utilized for braking in a landing situation.

11. The method as set forth in claim 3 wherein an aircraft landing gear comprises a sixteen-wheel configuration and the controller is programmed to select a first group for an initial taxi braking of the aircraft and sequentially selects additional groups for subsequent taxi braking, said controller being programmed to revert to sixteen-wheel braking when subject to a landing operation.

* * * * *